April 5, 1966  J. A. HULL  3,244,936
SPARK DISCHARGE DEVICE
Original Filed Oct. 31, 1957  6 Sheets-Sheet 2

JOSEPH A. HULL
INVENTOR.

BY

ATTORNEY

JOSEPH A. HULL
INVENTOR.

April 5, 1966 J. A. HULL 3,244,936
SPARK DISCHARGE DEVICE
Original Filed Oct. 31, 1957 6 Sheets-Sheet 4

JOSEPH A. HULL
INVENTOR.

BY

ATTORNEY

April 5, 1966    J. A. HULL    3,244,936
SPARK DISCHARGE DEVICE
Original Filed Oct. 31, 1957    6 Sheets-Sheet 5

JOSEPH A. HULL
INVENTOR.

BY

ATTORNEY

JOSEPH A. HULL
*INVENTOR.*

BY

ATTORNEY

United States Patent Office 3,244,936
Patented Apr. 5, 1966

3,244,936
SPARK DISCHARGE DEVICE
Joseph A. Hull, Danvers, Mass., assignor, by mesne assignments, to Unilectron, Inc., Cambridge, Mass., a corporation of Massachusetts
Original application Oct. 31, 1957, Ser. No. 693,570, now Patent No. 3,041,936, dated July 3, 1962. Divided and this application Apr. 3, 1962, Ser. No. 193,031
3 Claims. (Cl. 315—237)

This invention relates to control devices and more particularly to spark discharge devices especially useful in the photographing of objects moving at high speed, such as missiles under test. This is a division of my application Serial No. 693,570, filed October 31, 1957, now Patent No. 3,041,936.

The invention has particular application to studies wherein re-entry conditions of intercontinental ballistic missiles are aerodynamically simulated. It is customary for such simulation studies to be made in conjunction with a model of the missile which is projected at high speed in a ballistic range or tested in high speed wind tunnels. As techniques for obtaining high velocities have been improved, the demands on instrumentation required for measuring associated parameters have also increased. High speed photographic techniques used to record the position of models in flight, along with a history of the flow pattern surrounding the model, are particularly useful. If one considers a projectile travelling at a velocity of 20,000 feet per second, being photographed on film having a resolution of 20 lines per mm. at a magnification factor of ½, it will be apparent that it is necessary to limit the exposure time of the film to .01 microsecond in order to prevent image blur caused by motion of the projectile.

Briefly, the present invention comprises an improved spark discharge device which enables a light source to be synchronized with an output device such as a pulse generator which is capable of delivering to a Kerr cell extremely large, high speed voltage pulses for operating the cell as a high speed optical light valve or shutter. The spark discharge device produces the pulse for the Kerr cell by enabling a pulse generator to discharge its energy through a spark gap which may also be arranged to produce radiant energy for illuminating the subject being photographed. Special circuits are provided for triggering the spark discharge so that the subject will be photographed when it is within the field of view of an associated camera.

It is also within the purview of the invention to provide an improved multiple trigger spark discharge device and associated circuit for taking several pictures of the same subject at short time intervals. This circuit produces trigger pulses for initiating spark discharge at pre-selected known time intervals.

Through the improvements made in the spark discharge devices, illumination means, and trigger circuits, it is possible to use a Kerr cell of unusually large proportions suitable for photographing high velocity subjects with a relatively large magnification factor and to assure automatic and perfect synchronization of the illumination of the subject with the operation of the Kerr cell.

In view of the foregoing it will be understood that it is a general object of the invention to provide improved means for taking high speed photographs, particularly photographs of subjects moving at extremely high velocities.

A further object of the invention is the provision of an improved spark discharge device which is capable of controlling the pulse generator while simultaneously providing illumination of the subject being photographed. More particularly, a spark discharge device is provided which can be charged with inert gases under pressure in order to prevent premature ionization of the spark gap and also to increase illumination efficiency.

Another object of the invention is to provide a multiple spark discharge device and means for applying separate trigger pulses to control the sequence and timing of the multiple discharges.

Another object of the invention is the provision of special circuits for operating both the single and multiple spark discharge devices whereby an associated Kerr cell can be used as a shutter for taking either single or multiple exposure photographs of high velocity subjects.

Other objects are as follows:

(1) Provision of an improved light screen for operating the trigger circuits so that Kerr cell operation will occur while the subject is within the field of view.

(2) Provision of an improved spark discharge device having at least two separate sets of electrodes for producing arcs under controlled atmospheric conditions.

(3) Provision of Kerr cell control circuits which may be used in conjunction with spark illumination or illumination by conventional light sources.

(4) Provision of means for producing a point source of light which is automatically synchronized with the operation of a Kerr cell.

The novel features that are considered characteristic of the invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 3 is a diagram of a trigger pulse circuit in association with a pulse generator and spark discharge device;

KERR CELL PRINCIPLES

Figure 1:
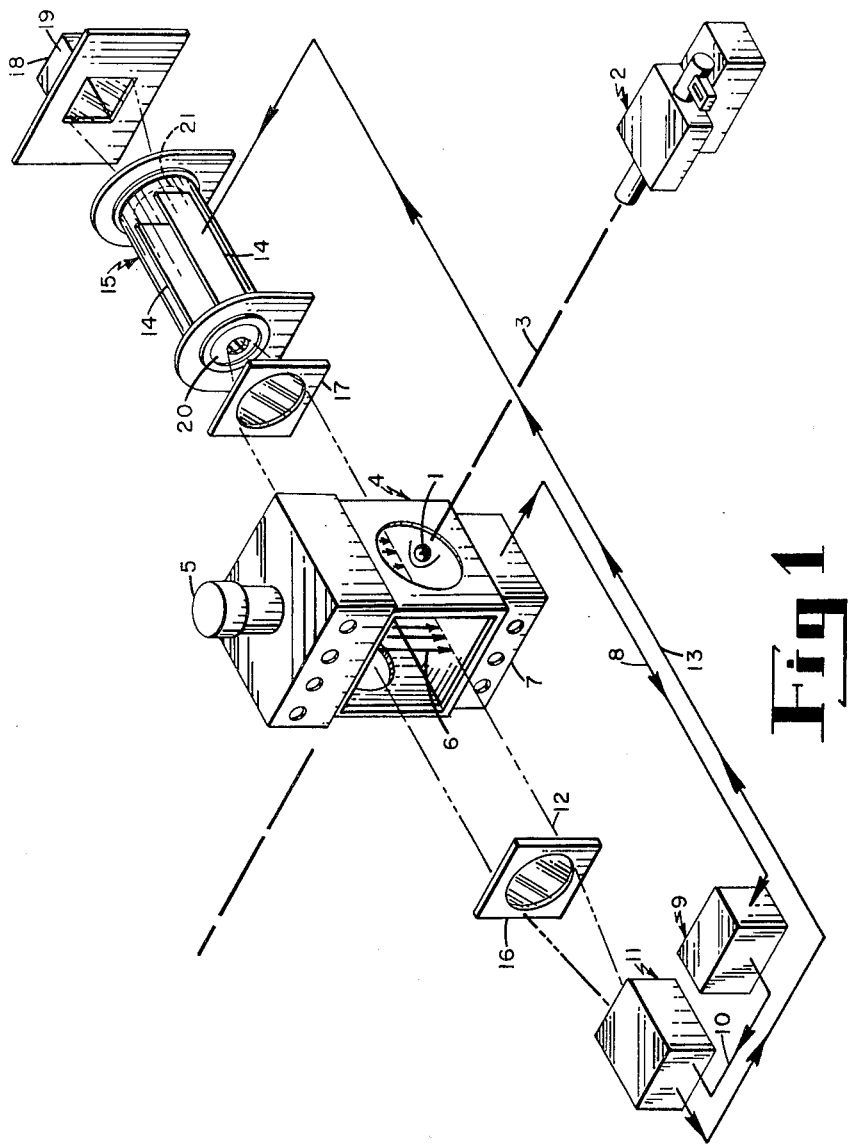
FIGURE 1 is a perspective view of a complete installation of a Kerr cell, pulse generator and associated components arranged for taking a shadowgraph picture of a high velocity projectile in a ballistic test range.

Sinch 1875, when Kerr first demonstrated the electro-optical effect, Kerr cells have been used as optical light valves or shutters. This type of shutter operates on the principle that certain normally isotropic substances such as water, nitrobenzene, and carbon disulphide, become optically anisotropic when subjected to electrostatic stress by application of a potential difference to suitably arranged electrodes. The electro-optical properties of the Kerr cell are due to what is known as the "Kerr effect," which is the effect of an electrical potential upon a substance having individual molecules which possess aeolotropic optical polarizability with reference to a set of axes within the molecule or a permanent dipole moment, or both. Upon application of a strong electric field to such a substance, the molecules assume a difinite orientation due to the permanent dipole moment. The substantially regular arrangement of molecules cause the substance to exhibit an over-all molecular asymmetry and optical anisotropy. Although electrical polarization alone will cause optical anisotropy, molecular orientation accounts for most of the Kerr effect in substances having a high Kerr constant.

With regard to optics, the significance of the Kerr effect is that a medium exhibiting such properties will, when subjected to a strong electrical field, become doubly refracting or birefringent. Materials possessed of this property transmit radiant energy, such as light energy, at different speeds, depending upon the plane of vibration of the energy relative to the field. In other words, the materials are anisotropic when electrostatically stressed, having different properties in different directions. Thus, an anisotropic medium has indices of refraction which depend upon the plane of polarization and direction of propagation of the light waves passing through the medium.

The typical Kerr cell incorporates a pair of spaced plates, which may be electrically charged, in a medium which exhibits the Kerr effect. Assuming that $N_p$ is the index of refraction of light waves travelling perpendicular to the applied field with the plane of polarization parallel to the applied field and $N_s$ is the index of refraction for light waves travelling perpendicular to the field with the plane of polarization perpendicular to the field, Kerr established the following relationship:

$$\frac{N_p - N_s}{\lambda} = BE^2$$

where $N_p$ and $N_s$ are the above defined indices of refraction, B equals the Kerr constant, E is the applied field in esu, and $\lambda$ is the wave length of the incident light in a vacuum.

If it is assumed that plane polarized light enters such an anisotropic medium with its direction of propagation perpendicular to the field and with its electric vector oriented at some angle $\phi$ with respect to the applied field, the light wave may be resolved into ordinary and extraordinary components parallel to and perpendicular to the direction of the field. The difference in velocity of propagation of the parallel component and that of the perpendicular component will result in a relative phase shift of the components as the wave passes through the length of the field. The phase shift $(d)$ is a linear function of the length of the field and may be calculated from the formula $$d = 2\pi BLE^2$$

where L is the length of propagation in centimeters, B is the Kerr constant, and E is the applied field in esu. This phase shift causes the emergent light wave from the Kerr cell to be elliptically polarized. For a relative phase shift $d = \pi$ radians, a special case results in which the emergent wave is plane polarized.

Figure 6:
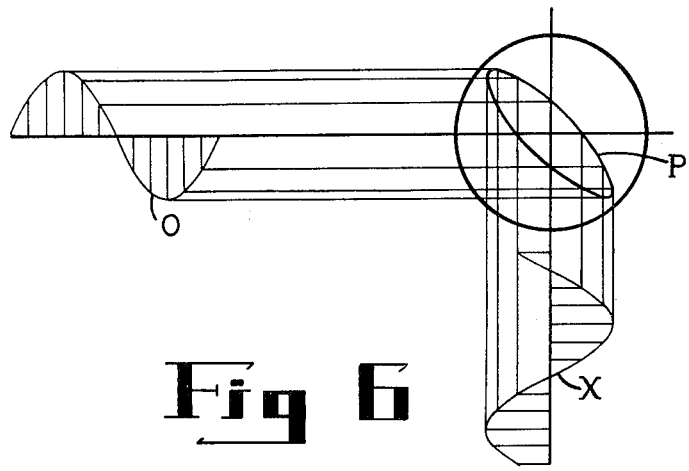
FIGURE 6 is a Lissajou diagram of elliptically polarized light waves from a Kerr cell.

FIGURE 6 illustrates elliptical polarization. In this figure, "X" represents the extraordinary component which is phase shifted by approximately $\pi/4$ radians relative to the ordinary wave "O." This figure, constructed by Lissajou's mechanics, illustrates that these waves combine to form an elliptically polarized emergent wave. If voltages proportional to be the component waves are impressed on the horizontal and vertical deflection plates of a cathode ray tube, an elliptical pattern such as P results on the face of the tube.

Figure 7:
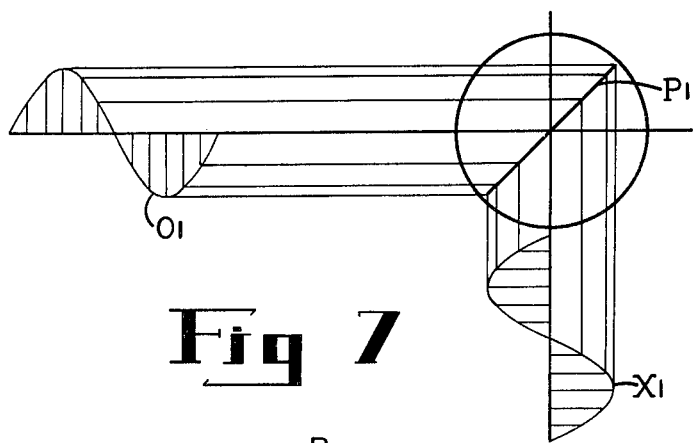
FIGURE 7 is a Lissajou diagram of plane polarized light waves from a Kerr cell.

In FIGURE 7, "$X_1$" represents the extraordinary component which is phase shifted by $\pi$ radians relative to the ordinary component, "$O_1$" resulting in plane polarization of the emergent wave from the Kerr cell. This is indicated by the linear trace $P_1$ determined by Lissajou's mechanics. A similar trace would appear on the face of a cathode ray tube wherein deflection of the electron beam is proportional to the component waves.

From the foregoing it will be apparent that if a polarizer is oriented so that the light entering a Kerr cell is plane polarized with its electric vector at an angel of $\phi = 45°$ with the applied field across the Kerr cell, and an analyzer is positioned after the Kerr cell with its plane of polarization oriented at 90° with respect to that of the polarizer, there must exist a combination of length and applied voltage for the Kerr cell which will produce a phase shift $d = \pi$ radians. Such phase shift results in the emergent beam being plane polarized in the plane of the analyzer as can be readily shown by Lissajou's mechanics. For a given value of L, the necessary potential V in volts may be readily determined from the foregoing equation, bearing in mind that the field strength is proportional to the gradient of the voltage across the plates. Thus:

$$d = \pi = 2\pi BLE^2 = 2\pi BL\left(\frac{V}{300D}\right)^2$$

or $$V = 300D\sqrt{\frac{1}{2LB}}$$

where $D$ = the distance between the plates in centimeters.

During the time the field is applied, the effective rotation of the plane polarized wave by the Kerr cell permits light to pass from the polarizer, through the Kerr cell and the analyzer. Upon interruption of the field, the Kerr cell becomes optically isotropic and no light will pass through the analyzer, since it is "crossed" relative to the polarizer. Hence, such an arrangement may be used as an optical shutter.

A consideration of the foregoing equations will make it apparent that the voltage must increase linearly as the distance "D" between the plates increases. Because of the unavailability of high potential sources, Kerr cells in the past had very small apertures or narrow spacing between the plates and were therefore of limited utility. By applying a very large voltage to the plates, it is possible to provide spacing equivalent to a large aperture, or "f" number in photographic terms. This obviously increases the utility of the Kerr cell for extremely high speed photography. With wide plate spacing, it is possible to use a long focal length lens capable of producing a large image at the film plane. In this way the poor resolution of fast films can be offset somewhat.

Wide plate spacing dictates that the voltage must be quite high or the length of the cell must be made quite long. Lengthening the cell increases absorption of light rays within the cell and adversely affects the angle of view of the light system. It is therefore desirable to keep the length as short as possible, consistent with reasonable values of applied voltage.

Nitrobenzene is widely used in Kerr cells because of its relatively high Kerr constant ($346.0 \times 10^{-7}$ esu). As will be evident from the last equation, this also minimizes the amount of voltage necessary to produce the necessary phase shift within the cell. Electrical conductance through nitrobenzene is sufficiently small that it may be neglected and the Kerr cell appears as a pure capacitive load on the circuit used to drive it.

Assuming that it is desirable to use a camera lens having a focal length of 5" with an aperture of "f/3.5," separation of 3.5 centimeters would be required for an assumed plate length equal to 10.5 centimeters. The capacitance "C" of the plates can be determined from the equation $$C = .0884 K \frac{A}{b}$$

where "C" is the capacitance in $\mu\mu f.$, "K" is the dielectric constant between the plates (about 22 for nitrobenzene at frequencies above $10^7$/second), "A" is the area of one plate in cm.$^2$, and "b" is the distance between the plates in centimeters. For the assumed values, the capacitance of the plates will be 28 $\mu\mu f.$ and the required voltage to produce the desired phase shift will be approximately 40 kilovolts.

Figure 8:
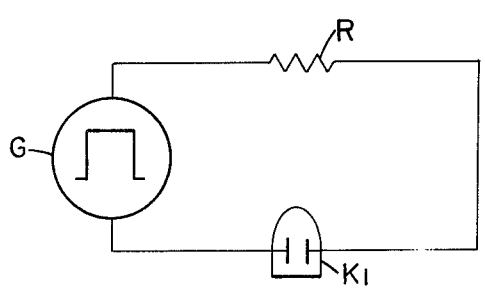
FIGURE 8 is a schematic representation of a pulse generator in circuit with a Kerr cell.

Shown in FIGURE 8 is an equivalent circuit for the Kerr cell $K_1$ and a pulse generator "G" for driving the cell. If the output of the generator is a square-wave voltage pulse of duration $5 \times 10^{-8}$ seconds, a suitable internal resistance "R" of the generator may be defined as that resistance which, when combined with the capacitance of the Kerr cell, will produce a charging or discharging time constant equal to one-tenth of the pulse duration. For the Kerr cell whose proportions have been assumed above, the time constant $T=RC=.5 \times 10^{-8}$. Substituting the value of the Kerr cell capacitance, the internal impedance or resistance of the pulse generator will be found to be approximately 128 ohms.

The foregoing numerical values are merely representative and should not be construed as limitations of the invention. By applying an 80 kilovolt voltage pulse to a cell having 2-inch long plates spaced at 2 inches, an exposure time of $10^{-8}$ second can be obtained. This approaches the practical operating limit of a Kerr cell having nitrobenzene since the time for such fluid to assume its birefringent characteristics after being subjected to a voltage pulse is approximately $10^{-9}$ second.

GENERAL DESCRIPTION

Attention should now be directed to FIGURE 1 which shows a complete installation for taking a picture of a high velocity projectile 1 fired from a projectile launcher, generally designated 2. The projectile travels along path 3 through a light screen assembly, generally designated 4. This assembly includes a low power light source 5 of approximately 25 watts output which projects a thin screen of light, indicated at 6, toward a photocell 7. The screen, which in transverse section may measure .1 inch thick and 4 inches wide, is positioned transversely of path 3 so that the projectile will interrupt the light screen and modulate the intensity of light received by the photocell. This results in a pulse which is amplified and supplied by conductor 8 to a trigger pulse circuit, indicated generally at 9. This circuit delivers a trigger pulse through conductor 10 to the spark discharge assembly and pulse generator, generally designated 11, resulting in discharge of electrical energy formerly stored in the pulse generator. Projectile 1 is illuminated by light rays 12 emanating from the spark discharge.

Simultaneously, a voltage pulse, which may be as high as 80 kilovolts, is delivered through conductor 13 to the plates 14 of a Kerr cell assembly, generally indicated at 15.

The illuminated projectile can either be directly photographed or photographed by shadowgraph techniques. The latter offer the advantage of recording the shock waves and wake associated with the projectile. The installation of FIGURE 1 is arranged for shadowgraph photography. Thus, the light rays 12 are collimated by condensing lens 16 for illuminating projectile 1. The objective lens 17 is focused on the rear face of the screen assembly at which plane a shadow of the projectile and its attendant shock wave is formed. The resulting shadow picture is focused by the objective lens on the film plane 18 of camera 19.

Light rays, in passing from the objective lens 17 to the film plane 18, pass through the Kerr cell assembly which comprises a polarizer 20 attached to the front of the assembly, the Kerr cell proper with plates 14, and an analyzer 21, attached to the rear of the assembly.

Prior to interruption of the light screen 6 by the projectile, the plates of the Kerr cell are at zero potential and the plane polarized light from the polarizer 20 is almost completely blocked by analyzer 21. Athough the Kerr cell transmits a very small amount of light when it is not energized, the light rays of the light screen do not reach the film plane since they are directed at 90° to the axis of the Kerr cell. Care is taken to prevent dust particles from entering the screen assembly and diffusing the light from the light screen.

During most of the time that the high potential pulse is applied to the plates of the Kerr cell—some of the pulse period is required to orient the molecules within the cell—the plane polarized light from polarizer 20 is effectively rotated so that it will pass through analyzer 21 and expose the film at the film plane 18. Since the high voltage pulse is of short duration, the exposure of the film is accomplished in a short time period which may be in the order of $10^{-8}$ second.

Camera 19 may be a conventional camera with a mechanical shutter which is opened just prior to firing of the projectile launcher and is closed after the film is exposed. In itself, the mechanical shutter does not take an active part in taking the high speed photograph.

DETAILS OF KERR CELL

Figure 2:
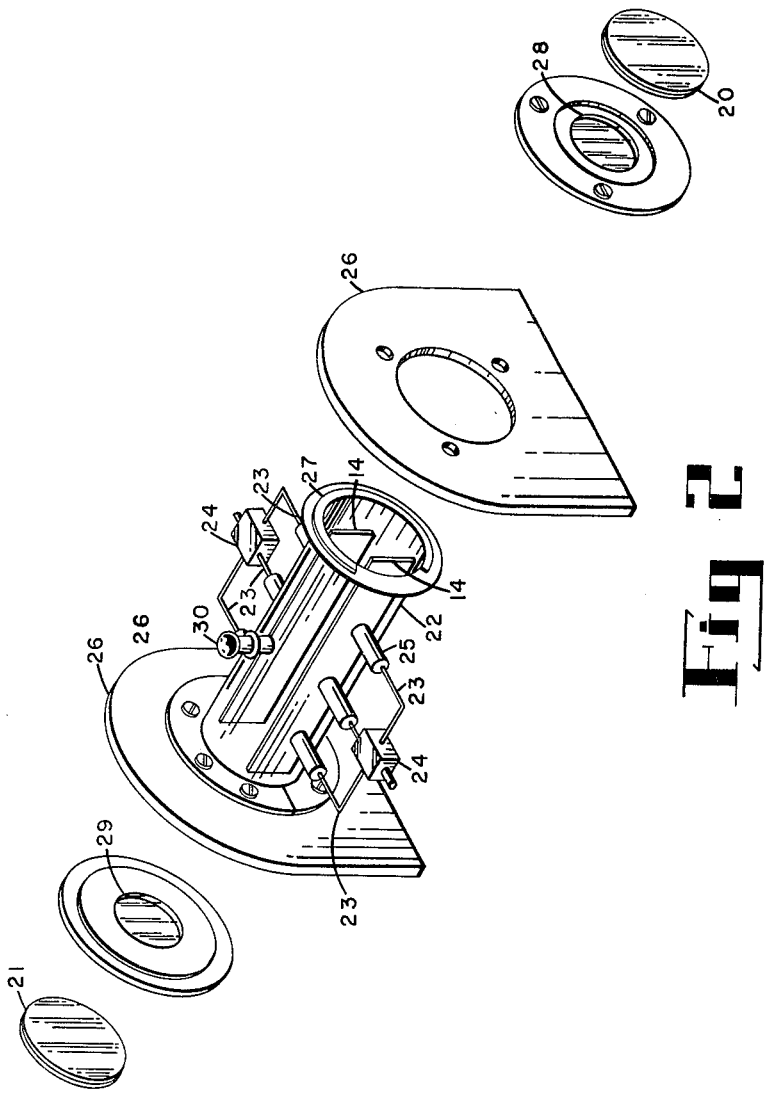
FIGURE 2 is an exploded view of a Kerr cell showing its internal construction.

Attention is now invited to FIGURE 2 which shows structural details of the Kerr cell assembly. The Kerr cell proper comprises a tube 22 of heat-resisting, soda-alumina-borosilicate glass within which are positioned the plates 14 to which the voltage pulse from the pulse generator is applied. The plates themselves are made from pure copper and are spaced parallel to each other within a tolerance of about ±.001 inch. The surfaces of the plates facing each other are sandblasted to prevent specular reflection. Since the plates are relatively large, it is desirable to support them at a plurality of points. Thus, each plate is supported by three tungsten leads 23 which are electrically connected to a common junction point 24. The leads are sealed to glass extensions 25 projecting from the sides of cylinder 22. In this way the entire assembly is rendered liquid-tight.

To simplify attachment of the tungsten leads to the copper plates 14, an intervening section of nickel (not shown) may be provided. The machinability of the nickel permits threaded connection to the plates, the nickel sections being welded to the tungsten leads.

The ends of the cylinder are bolted to supports 26 which may be made from phenolic plastic or any other suitable material. At the time of assembly a silicone gasket 27 is interposed between these parts to provide a liquid seal. Optically flat glass end plates 28 and 29 are attached to the fore and aft supports 26. These are also bolted in place with suitable gaskets.

The polarizer 20 and the analyzer 21 are directly attached to the exterior faces of the end plates 28 and 29, respectively. Both the polarizer and the analyzer are made from positive dichroic sheet material, sold under the trademark Polaroid-type HN22, mounted between optically flat sheets of glass. These are not shown in detail since they are conventional and well-known in the art.

It has been determined that the polarizer and analyzer, when positioned for maximum light transmission, will transmit approximately 7% of an incident ray of light. Interposition of the Kerr-cell between the polarizer and analyzer causes transmission to drop to 6% of the incident light since the fluid within the cell absorbs a small amount of light.

From the standpoint of light transmission it would be desirable, if practical, to utilize Nicol prisms instead of the "Polaroid" material. However, at the present state of the art, these Nicol prisms would be prohibitively expensive for a Kerr cell of the physical dimensions shown.

The Kerr cell assembly is completed by being filled with highly purified nitrobenzene through filler cap 30.

SINGLE TRIGGER PULSE CIRCUIT

FIGURE 3 shows schematically a circuit for supplying a trigger pulse to a spark discharge device in association with a transmission line pulse generator and Kerr cell.

The trigger pulse circuit is supplied with power through 110 v. alternating current lines $L_1$ and $L_2$. These are connected across the primary 30a of transformer 31. The secondary 32 of the transformer is connected with plates 33 of a double diode rectifier tube 34. Winding 35 of the transformer supplies current to directly heated filament 36 of the diode which serves as a full wave rectifier in conventional manner. Another winding 37 supplies current to heater 38 of thyratron tube 39.

The thyratron tube is a type 2D21 gas filled tube including plate 40, screen grid 41, control grid 42, and cathode 43. The plate 40 is connected through resistor 44 to conductor 45 which may be regarded as the B+ supply.

Grid 42 is biased relative to cathode 43 through grid resistor 46 and potentiometer 47 to hold the tube below cut-off.

The resistor of the potentiometer 47, in cooperation with the condenser 48, forms the filter for the grid bias supply, whereas condenser 49 serves to filter the B+ supply. Resistor 50 is a bleeder to improve the power supply voltage regulation.

The thyratron, which is normally non-conducting, may be triggered by manually closing normally open switch 51. This will charge condenser 52 to B+ potential and will feed a positive voltage transient through blocking condenser 53 to control grid 42. In this way thyratron 39 will be rendered conductive, and the energy stored in condenser 54 will discharge via the primary 55 of pulse transformer 56 and conductors 57–59. The resulting pulse in the secondary 60 of the pulse transformer is applied to trigger electrode 61 which is centrally positioned and insulated from spark gap electrode 62.

If desired, the thyratron may be triggered by a positive pulse applied at 63 to the grid circuit of the thyratron. Triggering is accomplished in this manner when the circuit is used in conjunction with a photocell and amplifier circuit, such as schematically illustrated in FIGURE 1. Such portions of the circuit, being conventional and well-known, have not been illustrated.

After switch 51 is opened, the charge on condenser 52 equalizes through resistor 64a. The thyratron falls below cut-off by current starvation as condenser 54 discharge sufficiently to drop the potential of plate 40 below ionizing potential.

The over-all function of the circuit is to supply a positive trigger pulse of 15,000 volts to trigger electrode 61. This initiates ionization in the gap between spark discharge electrodes 62 and 64, triggering release of energy which was stored in the pulse generator, generally designated 65, by connection of a large negative potential —E to charging resistor 66. It is sufficient to understand at the moment that the pulse generator is charged with high potential energy which is released by the spark discharge between electrodes 62 and 64. This establishes a large potential drop across resistor 67 which is grounded at 68. A large potential drop is also established between electrode 62 and annular electrode 69, resulting in a second and substantially simultaneous discharge of energy between these latter two electrodes which is visible through the center of the annular electrode 69 and supplies the illumination for the subject being photographed.

PULSE GENERATOR

A pulse generator which has been found remarkably effective comprises a single loop of type RG8/U cable having two parallel legs. The free ends of the cable 70 and 71 are positioned adjacent each other with the bight 72 of the cable remote from the ends. The cable, which may be regarded as a series of lumped inductive and capacitive impedances, consists of a central conductor, the ends of which are exposed at 73 and 74, separated by dielectric insulation from braided shielding, sections of which are shown at 75–77. Shielding sections 75 and 76 are interconnected by conductors 78 and 79 whereas conductor 80 interconnects the adjacent ends of shielding 77.

A metallic film non-inductive type load resistor 81 is interconnected between conductors 79 and 80 and is also connected across conductors 82 and 83 which are connected to the plates of a Kerr cell, indicated diagrammatically at 84. It will be noted that the shielding is stripped away exposing the insulation at 85 and 86.

It can be established both by calculation and by experiment that a single square wave pulse can be delivered to the plates of the Kerr cell if resistor 81 is made equal to twice the characteristic impedance of the cable. Although the characteristic impedance of RG8/U cable is 52 ohms, when paralleled the characteristic impedance is 26 ohms. Hence, resistor 81 should theoretically be made equal to 52 ohms in order to drive the Kerr cell with a single voltage pulse. Using parameters of such proportions, all other voltage pulses reflected from the ends of the cable and the resistor will mutually cancel, as will now be explained.

Before application of the trigger pulse to electrode 61, the pulse generator is charged to a high potential by a conventional 50 kilovolt, 2 milliampere power supply through charging resistor 66. The charging potential may lie in the range 35–50 kilovolts depending upon the proportions of the Kerr cell. When fully charged, energy is stored in the pulse generator by stresses in the dielectric between the conductor and shielding of the cable. When the spark discharge is triggered between electrodes 62 and 64, a voltage pulse of magnitude +E (a sign reversal may be regarded as resulting from the closing of switch 51) travels from the free ends along each leg of the cable to the center region of the transmission line. Here, the voltage pulse encounters a discontinuity of impedance resulting in a reflected wave front of $+1\frac{1}{3}E$ being reflected along each leg of the cable toward the free ends. One-third of the original pulses are dissipated in resistor 81. The remaining one-third of the pulses travel along each leg of the cable to bight 72 where they are reflected without change of sign to form two wave fronts of $+\frac{2}{3}E$ travelling along each leg of the cable back toward the load resistor 81. By the time these wave fronts reach the load resistor, the other reflected wave fronts do also, having reached the free ends of the cable and been reflected with a reversal of sign so that the reflected wave fronts of identical magnitude meet at the load resistor where they mutually cancel each other.

It has been seen that, when the impedance of the load resistor is equal to twice the characteristic impedance of the parallel cable generator, a single voltage pulse of +E is applied to the plates of the Kerr cell for a time duration equal to that necessary for the wave fronts to travel from the resistance 81 to the free ends of the cable and back to the resistor. Thus pulse duration is a function of cable length. For a pulse duration of .01 microsecond, it is recommended that the length of the generator from the free ends to the bight be 7 feet and that the load resistor be positioned in the center of this length.

Advantages obviously can be gained by delivering a square wave pulse larger than E to the Kerr cell. It has been found that a pulse equal to $1\frac{1}{3}E$ can be delivered by the pulse generator even though it is only charged to a potential of —E if the load resistor is increased from 52 to 100 ohms. This, however, results in wave front reflections in the generator which are not totally cancelled. In fact, using a load resistor of 100 ohms, an uncancelled wave front of $\frac{1}{3}E$ will be applied to the Kerr cell sometime after the main pulse of $1\frac{1}{3}E$.

The provision of bight 72 is important. Provision of the bight instead of free ends makes is possible to avoid undesirable high voltage corona effects. Further, the transmission line pulse generator is rendered less susceptible to variations due to humidity and other atmospheric effects. The over-all result is a substantial improvement in the over-all consistent operation of the generator.

After the trigger pulse is applied to the electrodes, approximately .01 microsecond elapses before ionization is complete and the arc of the spark discharge is fully established. As the arc is established, voltage pulses travel along the legs of the pulse generator until they encounter the impedance discontinuity. It is at this time, approximately .005 microsecond after the arc is established, that the square wave pulse is first applied to the Kerr cell. Duration of this pulse will depend upon the proportions of the pulse generator, as has been explained. However, for high speed photography a duration of approximately .01 microsecond is desirable. Since the time necessary to orient the molecules of the fluid within the Kerr cell is relatively small, the time during which emergent light from the Kerr cell passes through the analyzer is equal for practical purposes to the duration of the pulse applied to the Kerr cell.

Illumination of the subject begins as the arc is established between the pair of electrodes and is maintained at peak intensity during the time that light entering the Kerr cell passes through the analyzer. Since the emanation of light from the arc occurs over a time interval of above .2 microsecond, it will be apparent that synchronization of Kerr cell and source of illumination presents no problem and synchronization is fully automatic.

SINGLE TRIGGER SPARK DISCHARGE DEVICE

Figure 5:
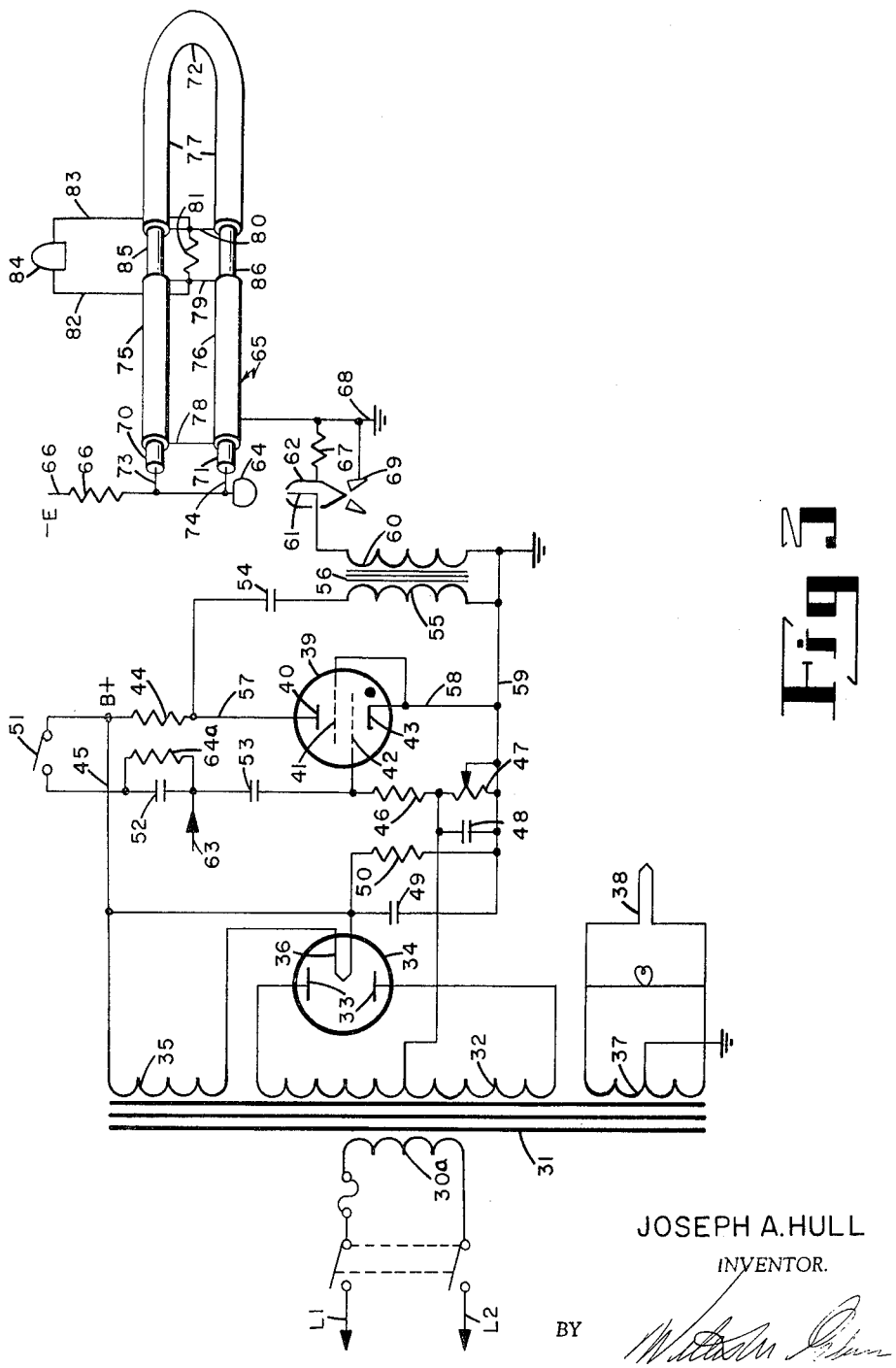
FIGURE 5 is an end elevational view of the spark discharge device shown in FIGURE 4, the end view showing the concentric electrode for producing illumination of the subject at the time that it is photographed.
Figure 4:
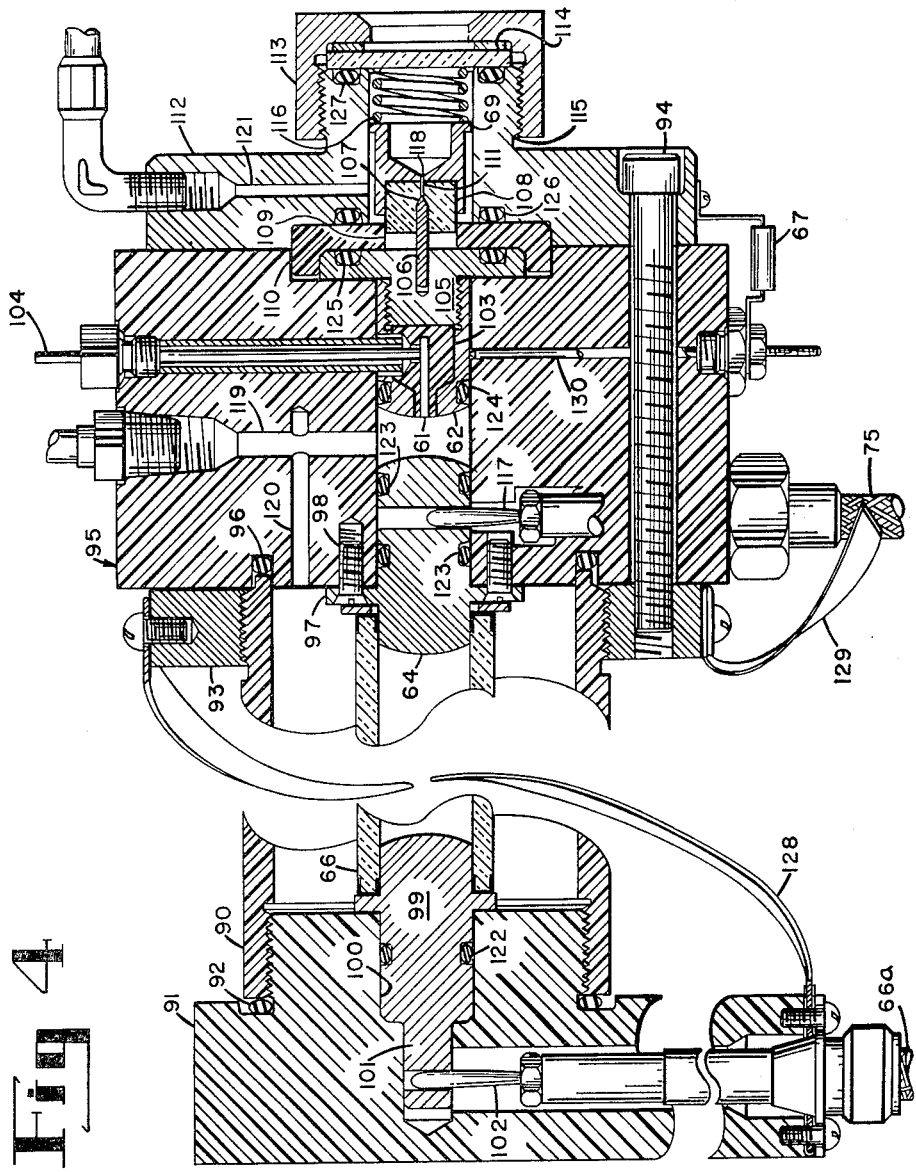
FIGURE 4 is a longitudinal cross-sectional view taken on plane 4—4 of FIGURE 5 showing a spark device which may be used in conjunction with the circuit of FIGURE 3.
Figure 5:
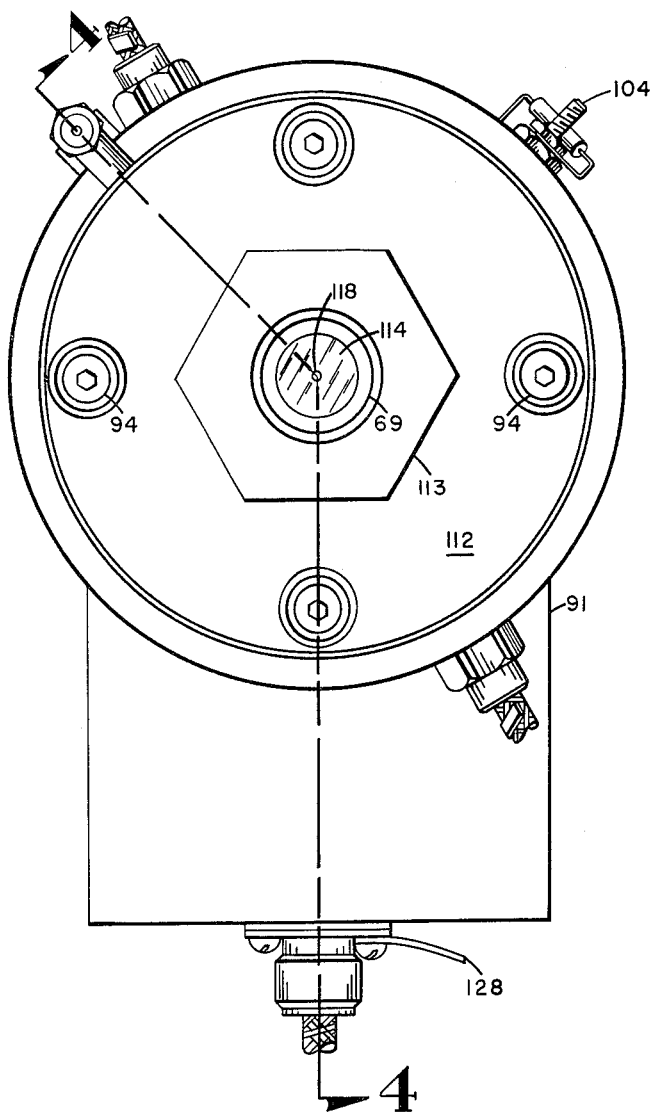

FIGURES 4 and 5 disclose the structure of the spark discharge device including electrodes 62, 64 and 69, in addition to the trigger electrode 61.

The body of the device comprises a tubular center section 90 which may be made from plastic or other insulating material. This is threadedly connected to a plastic end cap 91 with a seal ring 92 clamped between the components to assure a gas-tight fit. The opposite end of the center section 90 is threadedly engaged with a metal ground ring 93 which is attached, as by bolts 94, to an end assembly, generally designated 95. Another seal ring is provided at 96 between the end of center section 90 and the end assembly 95 to make the entire device gas-tight.

Electrode 64 is cylindrical in form and includes an integral flange 97 which is attached by screws 98 to the end assembly. Concentric with and spaced from this electrode is an electrically conductive pilot 99 which is closely fitted within cylindrical opening 100 of the end cap 91. The pilot includes an extension 101 with which electrical connection is made by banana connector 102.

Electrode 64 and pilot 99 support and make electrical connection with the metallic film charging resistor 66 which is cylindrical in form. The resistor includes silver plating at its end surfaces through which electrical connection is made with the electrode and pilot.

It should be noted that the electrode 62 is hollow and houses a cylindrical insulator 103 within which the trigger electrode 61 is imbedded concentrically with the electrode 62 in such manner that the exposed ends of the electrodes define a smooth spherical surface.

Conductor 104 extends through one side of the end assembly 95 and makes connection with the trigger electrode 61. This conductor conveys the trigger pulse from the secondary 60 of the pulse transformer 56 (see FIGURE 3) to trigger electrode 61.

A flanged plug 105 is threaded inside of the electrode 62 to confine the insulator 103. This plug, like the electrode 62, is made from electrically conductive material and supports an auxiliary electrode 106 having a conical pointed end 107. A small cylindrical insulator 108 is fitted within opening 109 of plastic pilot washer 110 which surrounds plug 105. Insulator 108 holds the auxiliary electrode 106 concentrically in place.

Attention is called to a small cylindrical passage 111 formed in insulator 108. This communicates with annular electrode 69 which is concentric with and surrounds insulator 108. This electrode is also made from electrically conductive material.

The annular electrode and immediately associated parts are supported by a steel end plate 112. Threadedly engaged with the end plate is a ferrule 113 which clamps an optically flat window 114 against cylindrical projection 115 of the end plate. A spring 116 is compressed by the window 114 against the end of the annular electrode 69 and serves to force it against the insulator 108, which in turn is forced against the end 107 of the auxiliary electrode.

It has been found convenient to make electrodes 62 and 64 and pilot 99 from brass. The trigger electrode may be made from steel. The auxiliary electrode 106 may be made from tungsten while the annular electrode is made from stainless steel.

Before considering additional details of the structure, attention is called to the fact that the auxiliary electrode 106 is in electrical communication with electrode 62 through plug 105 which may also be made from brass. The surrounding plastic washer 110 prevents short circuit of energy from plug 105 to end plate 112.

Attention is now invited to banana connector 117. To simplify the illustration, only one such connector has been shown, although it should be understood that another similar one is provided out of the plane of the drawing. These connectors establish an electrically conducting path between the ends 73 and 74 of the pulse generator (see FIGURE 3) to the electrode 64.

The pulse generator is charged with electrical energy through conductor 102, pilot 100, charging resistor 66, and electrode 64. This establishes the very large potential difference, in the order of 35 to 50 kilovolts, across the gap defined by electrodes 62 and 64. When the trigger pulse is delivered to the electrode 61, ionization of gas between the electrodes 62 and 64 is initiated, resulting in a sudden discharge of energy as an arc between the electrodes. This produces a large potential difference across resistor 67 (see FIGURE 3) and causes a second spark discharge from the auxiliary electrode 106 to the annular electrode 69. The radiant energy produced by the second spark discharge is transmitted through center opening 118 and the window 114 and serves to illuminate the object being photographed.

Resistor 67 is connected to electrode 62 by conductor 130. The other end of the resistor is connected to the metal end plate 112 which is grounded. Since electrode 69 is a close fit within the end plate, it also is grounded. Conductor 130 is shown rotated out of its true angular position (see FIGURE 5) to simplify the illustration.

In order to prevent spontaneous discharge prior to application of the trigger pulse, a controlled atmosphere at about 5 p.s.i.g. is provided in the gap between the electrodes 62 and 64. This atmosphere, which may be freon gas ($CCl_2F_2$), is introduced to the gap and to the region surrounding resistors 66 by passages 119 and 120.

A controlled atmosphere is also provided between the electrodes 106 and 69. This atmosphere may consist of xenon, argon, or some other inert gas, introduced through passage 121. By using a charging pressure of 600 to 800 p.s.i.g., not only spontaneous spark discharge is prevented but illumination efficiency is increased through the increased density of atoms in the spark gap which are subjected to light emitting changes of energy level in their electron rings.

Seal ring 122 is provided on pilot 99 and similar seals are provided at 123 about electrode 64. Presence of other seals 124–127 will also be noted in positions which render the entire device gas-tight.

A ground strap 128 interconnects the shielding (not shown) of the conductor 66a (which conveys energy to conductor 102) to the ground ring 93. Another ground strap 129 interconnects shielding 75 of the transmission line generator with the ground ring 93. A similar ground strap (not shown in FIGURE 4) also interconnects shielding 76 with the ground ring. (Shielding 75 and 76 are indicated diagrammatically in FIGURE 3.) It will be understood that the ground ring is connected by separate means (not shown) to the ground connection of the circuit shown in FIGURE 3.

In partial summary, it will be noted that a device is provided having a single trigger electrode for initiating spark discharge between electrodes 62 and 64. The resulting discharge of energy causes a second spark discharge between electrodes 106 and 69 providing illumination for the subject being photographed. Both spark discharges occur substantially simultaneously within controlled atmospheres.

Shown in FIGURE 5 is the end view of the spark discharge device. Particular note should be taken of the window 114 and the opening 118 through which light for illuminating the subject passes.

PARAMETERS

The following parameters, although not limitations of the invention, have been used in the foregoing circuit of:

FIGURE 3

| | |
|---|---|
| Transformer 31 | Power transformer 320-0-320 volts D.C. |
| Rectifier tube 34 | Type 5Y3. |
| Thyratron tube 39 | Type 2D21. |
| Resistor 44 | 330,000 ohms, 1 watt. |
| Resistor 46 | 100,000 ohms, ½ watt. |
| Potentiometer 47 | 20,000 ohms, 2 watt. |
| Condenser 48 | 50 µfd., 50 volts D.C. |
| Condenser 49 | 20 µfd., 600 volts D.C. |
| Resistor 50 | 220,000 ohms, 2 watt. |
| Condenser 52 | .1 µfd., 600 volts D.C. |
| Condenser 53 | .01 µfd., 600 volts D.C. |
| Condenser 54 | 2 µfd., 600 volts D.C. |
| Transformer 56 | Winding ratio 35/1 step-up; 400 v. input; secondary insulated for 20,000 volts. |
| Resistor 64 | 22 megohms, ½ watt. |
| Resistor 66 | 100 megohms, 25 watt. |
| Resistor 67 | 100,000 ohms, 2 watt. |
| Resistor 81 | 100 ohms, 2 watt, metallic film. |

The various features and advantages of the invention are thought to be clear from the foregoing description. Various other features and advantages not specifically enumerated will occur to those versed in the art as likewise will many variations and modifications of the preferred embodiment of the invention, all of which may be achieved without departing from the spirit and scope of the invention.

Having described my invention, I claim:

1. A spark discharge device comprising a tubular section supported between insulating end members, an electrically conductive pilot supported by one of said end members, a combined pilot and electrode supported by said other end member, a tubular resistor supported by said pilot and said electrode and making electrical connection therewith, means for delivering high potential energy to said pilot, a means for storing electrical energy connected to said electrode, a second electrode adjacent to but spaced from said first electrode, a trigger electrode insulated from and concentric with said second electrode for establishing discharge of electrical energy from said storage means between said electrodes, an auxiliary electrode connected to said second electrode, an annular electrode spaced from said auxiliary electrode, a resistor interconnecting said second electrode and ground, and means for grounding said annular electrode, said annular electrode defining an opening through which spark discharge between said auxiliary electrode and said annular electrode is visible.

2. Apparatus as defined in claim 1 and, in addition, means for providing a controlled atmosphere in the gap between said first and second electrodes and a different controlled atmosphere between said auxiliary and said annular electrodes.

3. A spark discharge device comprising a tubular section supported between insulating end members, an electrically conductive pilot supported by one of said end members, a combined pilot and electrode supported by said other end member, a tubular resistor supported by said pilot and said electrode and making electrical connection therewith, means for delivering high potential energy to said pilot, a second electrode adjacent to but spaced from said first electrode, capacitive load means for storing electrical energy connected between said first and second electrodes, a trigger electrode insulated from and concentric with said second electrode for establishing discharge of electrical energy from said storage means between said electrodes, the exposed ends of said second and trigger electrodes defining a smooth spherical surface, an auxiliary electrode having a conical pointed end connected to said second electrode, an annular electrode spaced from said auxiliary electrode, a cylindrical insulator supporting the conical end of said auxiliary electrode concentrically with the aperture of said annular electrode and having a cylindrical passage defining the gap between said annular and auxiliary electrodes, a resistor interconnecting said second electrode and ground, and means for grounding said annular electrode, said annular electrode defining an opening through which spark discharge between said auxiliary electrode and said annular electrode is visible.

References Cited by the Examiner

UNITED STATES PATENTS

| | | | |
|---|---|---|---|
| 2,338,531 | 1/1944 | Naumann et al. | 338—331 |
| 2,400,456 | 5/1946 | Haine et al. | 313—198 |
| 2,781,707 | 2/1957 | Edgerton | 315—241 |
| 2,793,323 | 5/1957 | Miller | 315—241 |
| 2,795,738 | 6/1957 | Holliday | 315—241 |
| 2,881,685 | 4/1959 | Wagner | 315—241 |
| 2,937,299 | 5/1960 | Nolan | 315—241 |

OTHER REFERENCES

"Electronically Controlled Spectrographic Spark Source;" Nature, June 27, 1953, page 1156.

JOHN W. HUCKERT, *Primary Examiner.*

JAMES D. KALLAM, DAVID J. GALVIN,

*Examiners.*